United States Patent Office 3,092,845
Patented June 11, 1963

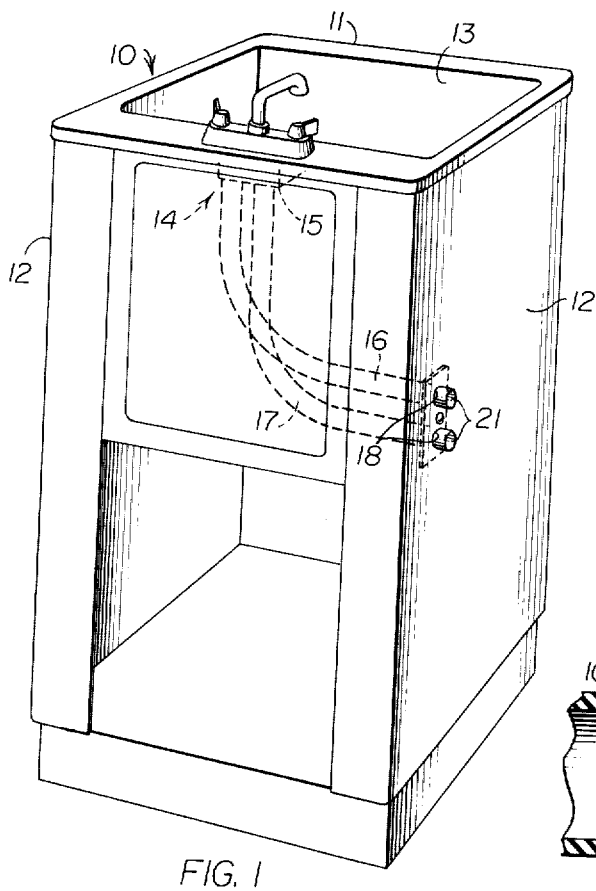
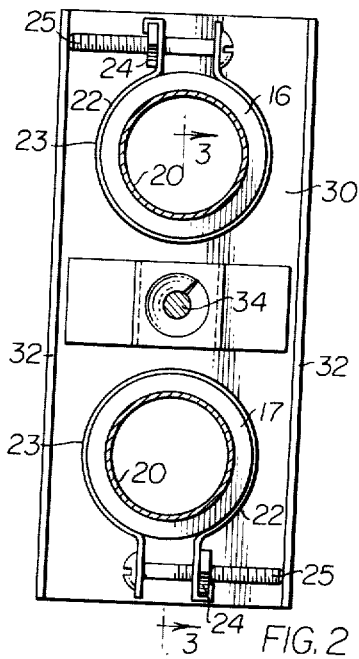
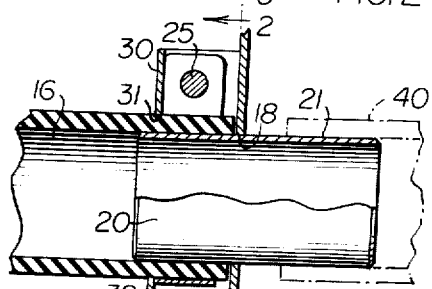
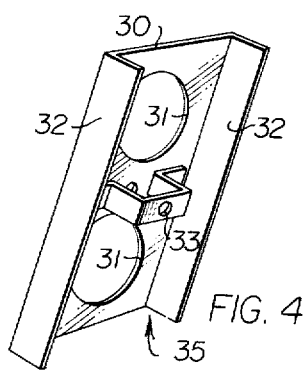
FIG. 1
FIG. 2
FIG. 3
FIG. 4
INVENTOR.
BERNARD E. MUSTEE
BY Watts, Edgerton, Pyle & Fisher
Attys.

3,092,845
LAUNDRY TUB HOSE SYSTEM
Bernard E. Mustee, Cleveland, Ohio, assignor to
E. L. Mustee & Sons, Inc.
Filed Apr. 28, 1961, Ser. No. 106,305
3 Claims. (Cl. 4—192)

This invention relates to the home-type laundry tub art, and more particularly to a laundry tub hose coupling system adapted to direct water from automatic washer hoses to a laundry tub disposal system.

Many automatic washers are of the so-called suds-saver type. The general principle upon which these washers operate is that of having one sytem to pump out the initial wash water with suds and repump it back into the washer at a later time for another washing cycle; and a second system to pump out rinse water which rinse water is discarded and not reused.

In order to use a suds-saver washer, it is necessary to have the wash water system in communication with a sink to retain the water containing the suds, and the rinse water system connected to a drain to carry away the rinse water. One such device for effectively using suds-saver type washers is shown and described in U.S. Patent 2,817,098 issued December 24, 1957 entitled "Laundry Water Distribution System." The device therein described includes a fixture having a pair of passages, one for conducting suds water and one for conducting rinse water. The sink has a drain at the bottom with a tubular plug placed upright in the drain. The plug is adapted to convey the water from the rinse water passage down the drain. The suds water passage empties into the sink and the tubular plug prevents the water in the sink from running out the drain.

The laundry water distribution system can be formed as a part of a laundry tub assembly having suds water and rinse hoses encased in a cabinet structure and connected to the passages of the fixture. The hoses of the distribution system are then connected to the hoses of the automatic washer. It is in the connection of the hoses of the water distribution system to the hoses of the washer that this invention lies.

One of the principal objects of this invention is to provide a hose coupling assembly adaptable to connect hoses from a laundry water distribution system to automatic washer hoses.

A more particular object of this invention is to provide a hose coupling assembly made in accordance with the above object which will constrain the coupled laundry tub hoses from axial and rotational movement.

Yet another more particular object of this invention is to provide a hose coupling assembly adapted to connect hoses from a laundry water distribution to the hoses of a suds-saver type automatic washer.

A more specialized object of this invention is to provide a facilely connectable hose coupling assembly for a cabinet encased water distribution system which will allow the hoses of the assembly to project selectably from either side of the cabinet.

Other objects and a fuller understanding of the invention may be had by referring to the following description and claims taken in conjunction with the accompanying drawing in which:

FIGURE 1 is a perspective view of a laundry tub assembly with the new and improved hose coupling in place.

FIGURE 2 is a front elevational view of the new and improved hose coupling taken along the plane represented by line 2—2 of FIGURE 3;

FIGURE 3 is a sectional view taken along the plane designated by line 3—3 of FIGURE 2; and, FIGURE 4 is a perspective view of the bracket of the hose coupling.

Referring now to the drawing, a typical environment for this invention includes a laundry tub assembly designated generally as 10. The laundry tub assembly 10 has a sheet metal front wall 11, a pair of sheet metal side walls 12, and an open back. A sink 13 adapted to receive and hold water is disposed at the top of the laundry tub assembly 10. A water distribution assembly of a type similar to that disclosed in U.S. Patent No. 2,817,098 dated December 24, 1957 is designated generally by reference character 14. This water distribution system includes a fixture 15, a suds hose 16, and a rinse water hose 17. The fixture 15 is separate and distinct from the conventional inlet mixing valve shown above fixture 15. The system is adapted to conduct the water through the suds hose 16 into the sink 13 where it may be retained, and to conduct the water through the rinse water hose 17 down a drain tube (not shown) standing upright in the drain outlet at the bottom of the sink. The construction and operation of such a distribution system is fully explained in the referenced patent.

A pair of hose coupling openings 18 are provided in each side wall 12. Preferably the openings of each pair are of the same size and in a vertically aligned relationship. In FIGURE 1 the hoses 16 and 17 are shown extending to one set of such openings 18 on the right hand side 12. The openings on the left side are concealed in FIGURE 1.

Each of the hoses 16, 17 has a tubular hose coupling 20 partially disposed co-axially in the hose with one end 21 projecting therefrom. The ends 21 are each shaped to pass freely through the hose coupling openings 18. The hoses 16, 17 are of sufficient size that they will not pass through the hose coupling openings 18 and are of sufficient length that the couplings 21 can be inserted through either pair of the hose coupling openings 18 depending on the location of a washer to be connected to the assembly. The ends 21 of the couplings are adapted to be connected to the hoses of an automatic washer externally of the tub assembly 10. Such a connection to hoses of a working appliance is suggested by the broken lines of two such hoses 40 and 41 shown in FIGURE 3 only.

The hose coupling assembly includes a bracket 30 having a pair of apertures 31. The apertures 31 are shaped and positioned to slide over the hoses 16, 17 and are axially alignable with the hose coupling openings 18. The bracket 30 includes a pair of lateral flanges 32 defining a channel 35 therebetween. The bracket is slipped over the hoses 16, 17 such that one hose projects through one aperture and the other hose projects through the other aperture. A hose clamp 22 is placed on each hose 16, 17. Each hose clamp 22 includes a clamp ring 23, a clamp nut 24, and a clamp bolt 25. The clamp ring 23 peripherally embraces the hose around the area wherein the hose coupling is disposed. When the clamp bolt 25 is tightened, an inwardly directed radial force is exerted on the hose by the clamp ring 23 to firmly clamp the hose against its associated coupling.

The clamps 22 are positioned in the channel 35 and shaped such that they will not pass through the apertures 31, but will abut the bracket 30 to prevent their passage through the apertures. Each clamp bolt 25 is of a length, and is positioned, to abut at least one of the flanges 32 and thus constrain rotative movement of the hose within the bracket 30. That is, although clamp 22 may rotate, it can rotate only until bolt 25 comes into contact with one or the other flange wall. The ends 21 of the couplings pass through the pair of hose openings 18 on the selected side of the laundry tube assembly 10, and the lateral flanges abut the inside of the tub side wall 12.

Each tub side wall 12 is provided with a screw passage 19 positioned between the hose coupling openings 18.

The bracket 30 has a threaded portion 33 located between the apertures 31 and in alignment with the side wall screw passage 19 when the bracket is in place. A screw 34 extends through the screw passage 19 and is threaded into the threaded portion 33 to firmly hold the bracket in place positioned in confronting relationship with the inner surface of the side wall to define a coupling enclosure.

As thus assembled, the hoses 16, 17 are constrained from rotative movement by the abutment of the clamp bolts 25 against one or the other of the flanges 32. The hoses also are constrained from axial movement in one direction by the abutment of the clamps 22 against the bracket 30 and are constrained from axial movement in the other direction by the abutment of the ends of the hoses 16, 17 against the inside of the tub side wall 12.

Although the invention has been described for use with suds-saver type washers embodying two hoses, it is readily adaptable to any washer having but one drain hose. For such applications the connection is made using only the rinse water hose 17. The rinse water hose is clamped and positioned in the bracket and the bracket mounted as described.

One of the outstanding features of this invention is the ease with which a strong coupling may be made between a washer and the laundry tub assembly on either side. Once the coupling is made the hoses are constrained from rotative movement and axial movement in both directions; hence, there is little or no tendency for the coupling to disengage or separate since movement tending to cause separation is constrained. Once the laundry tub assembly hoses have been positioned on the selected side of the laundry tub assembly and are held in place by the clamping device, the hose couplings project through the side wall of the tub. This presents a pair of hose couplings externally of the side wall which are adapted to receive the hoses of a washer. Thus, connections between the hoses of the washer and the hoses of the laundry tub assembly can be quickly and easily made and released externally of the laundry tub assembly at an easily accessible location.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a laundry tub assembly having a side wall structure and a hose the improvement which comprises:
   (a) an apertured bracket structure secured to the side wall, structure in confronting relationship to define a coupling enclosure;
   (b) said side wall structure having an aperture axially aligned with a bracket structure aperture;
   (c) said hose projecting through the aperture of one structure into said enclosure;
   (d) a coupling projecting through the aperture of the other of said structures and telescoped into the hose;
   (e) said coupling projecting outwardly of the assembly for connection to a conduit;
   (f) clamp means in said enclosure to securing said hose to the coupling; and,
   (g) said clamp means being constructed to limit both axial and rotational movement of the hose and coupling relative to the structures.

2. In a laundry tub assembly having a side wall structure and a pair of hoses the improvement which comprises:
   (a) an apertured bracket structure secured to the side wall structure in confronting relationship to define a coupling enclosure;
   (b) said side wall structure having a pair of spaced apertures each axially aligned with a bracket structure aperture;
   (c) each of said hoses projecting through different apertures of one structure into said enclosure;
   (d) a pair of couplings each projecting through different apertures of the other of said structures and telescoped into different hoses;
   (e) said couplings each projecting outwardly of the assembly for connection to conduits;
   (f) clamp means in said enclosure and securing each hose to the coupling telescoped therein; and,
   (g) said clamp means being constructed to limit both axial and rotational movement of the hoses and couplings relative to the structure.

3. In a laundry tub assembly having a side wall and a pair of hoses the improvement which comprises:
   (a) an apertured bracket in confronting relationship with the inner surface of the side wall and secured to the side wall to define a coupling enclosure;
   (b) said side wall having a pair of spaced apertures each axially aligned with a bracket aperture;
   (c) each of said hoses projecting through different bracket apertures into said enclosure;
   (d) a pair of couplings each projecting through different side wall apertures and telescoped into different hoses;
   (e) said couplings each projecting outwardly of the side wall for connection to conduits;
   (f) clamp means in said enclosure and securing each hose to the coupling telescoped therein; and,
   (g) said clamp means being constructed to limit both axial and rotational movement of the hoses and couplings relative to the side wall and bracket.

References Cited in the file of this patent

UNITED STATES PATENTS

| | | |
|---|---|---|
| 1,879,565 | Smith | Sept. 27, 1932 |
| 1,892,781 | Hoenstine | Jan. 3, 1933 |
| 2,780,241 | Mustee | Feb. 5, 1957 |

UNITED STATES PATENT OFFICE
CERTIFICATE OF CORRECTION

Patent No. 3,092,845                                        June 11, 1963

Bernard E. Mustee

It is hereby certified that error appears in the above numbered patent requiring correction and that the said Letters Patent should read as corrected below.

Column 3, line 54, after "wall" strike out the comma; column 4, line 7, for "to" read -- for --.

Signed and sealed this 10th day of December 1963.

(SEAL)
Attest:
ERNEST W. SWIDER

EDWIN L. REYNOLDS

Attesting Officer

Acting Commissioner of Patents